(12) United States Patent
Matsui et al.

(10) Patent No.: US 10,272,809 B2
(45) Date of Patent: Apr. 30, 2019

(54) VEHICLE SEAT

(71) Applicant: TOYOTA BOSHOKU KABUSHIKI KAISHA, Aichi-ken (JP)

(72) Inventors: Hayato Matsui, Chiryu (JP); Tatsuya Ono, Toyota (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 225 days.

(21) Appl. No.: 15/194,908

(22) Filed: Jun. 28, 2016

(65) Prior Publication Data

US 2017/0008432 A1   Jan. 12, 2017

(30) Foreign Application Priority Data

Jul. 8, 2015   (JP) ................................. 2015-137106

(51) Int. Cl.
     *B60N 2/75*   (2018.01)
(52) U.S. Cl.
     CPC ............. *B60N 2/753* (2018.02); *B60N 2/767* (2018.02); *B60N 2/78* (2018.02)
(58) Field of Classification Search
     None
     See application file for complete search history.

(56) References Cited

U.S. PATENT DOCUMENTS

| 5,131,721 | A |   | 7/1992 | Okamoto |            |
|-----------|---|---|--------|---------|------------|
| 5,342,115 | A | * | 8/1994 | De Filippo | B60N 2/753 |
|           |   |   |        |         | 297/411.32 |
| 7,992,941 | B2 |   | 8/2011 | Hara |            |
| 8,690,255 | B2 | * | 4/2014 | Yamaki | B60N 2/4228 |
|           |   |   |        |         | 297/216.14 |
| 2013/0113246 | A1 | * | 5/2013 | Kaku | B60N 2/4228 |
|           |   |   |        |         | 297/216.14 |
| 2013/0249267 | A1 | * | 9/2013 | Hosokawa | B60N 2/22 |
|           |   |   |        |         | 297/354.1 |
| 2014/0232161 | A1 | * | 8/2014 | Mitsuhashi | B60N 2/68 |
|           |   |   |        |         | 297/452.18 |
| 2014/0232162 | A1 | * | 8/2014 | Mitsuhashi | B60N 2/68 |
|           |   |   |        |         | 297/452.18 |
| 2015/0352982 | A1 | * | 12/2015 | Watanabe | B60N 2/68 |
|           |   |   |        |         | 297/354.12 |

(Continued)

FOREIGN PATENT DOCUMENTS

| CN | 1097970   | 2/1995 |
| CN | 101003262 | 7/2007 |
| CN | 101456371 | 6/2009 |

(Continued)

OTHER PUBLICATIONS

Office Action issued in China Counterpart Patent Appl. No. 201610522108.6, dated Jan. 25, 2018, along with a partial English-language translation thereof.

*Primary Examiner* — David E Allred
(74) *Attorney, Agent, or Firm* — Greenblum & Bernstein, P.L.C.

(57) ABSTRACT

In a seat in which an armrest is attached to a side frame of a seatback, a reinforcing member that inhibits lateral torsion deformation of the side frame at a location where the armrest is attached to the side frame when a lateral load is applied to the armrest, is cross-linked between the side frame and a lower panel arranged in a different location than the side frame.

8 Claims, 7 Drawing Sheets

(56) References Cited

U.S. PATENT DOCUMENTS

2016/0221485 A1* 8/2016 Harris .................... B32B 27/38

FOREIGN PATENT DOCUMENTS

| CN | 102481872 | 5/2012 |
|----|-----------|--------|
| JP | 2000-350637 | 12/2000 |
| JP | 2006-315496 | 11/2006 |
| JP | 2009-136484 | 6/2009 |
| JP | 2011-025827 | 2/2011 |

* cited by examiner

VEHICLE SEAT

INCORPORATION BY REFERENCE

The disclosure of Japanese Patent Application No. 2015-137106 filed on Jul. 8, 2015 including the specification, drawings and abstract is incorporated herein by reference in its entirety.

BACKGROUND OF THE INVENTION

1. Field of the Invention

The invention relates to a vehicle seat. More particularly, the invention relates to a vehicle seat in which an armrest is attached to a side frame of a seatback.

2. Description of Related Art

Japanese Patent Application Publication No. 2009-136484 (JP 2009-136484 A) describes one known structure of a vehicle seat in which an armrest is attached to a side portion of a seatback. The armrest is provided rotatably pin-connected to a bracket that is attached to an outside portion of a side frame of the seatback. This connection enables the armrest to be placed in either a raised position (a stored position) in which it is raised along the side portion of the seatback, or a lowered position (an in-use position) in which it is lowered in front of the seatback from the raised position.

With the related art described above, when a lateral load is placed on the armrest in the down position, a strong lateral torsional load is placed on the side frame of the seatback that supports the armrest in a cantilevered manner. Therefore, it is necessary to make the structure resistant to a load that twists the side frame laterally.

SUMMARY OF THE INVENTION

The invention therefore provides a vehicle seat in which a side frame of a seatback that supports an armrest has a structure that resists a lateral load received from the armrest.

One aspect of the invention relates to a vehicle seat in which an armrest is attached to a side frame of a seatback. In this vehicle seat, a reinforcing member that inhibits lateral torsional deformation of the side frame at a location where the armrest is attached to the side frame when a lateral load is applied to the armrest, is cross-linked between the side frame and a support frame arranged in a different location than the side frame.

According to this structure, the side frame of the seatback that supports the armrest is able to be structured to strongly resist a lateral load received from the armrest, by the reinforcing member that inhibits lateral torsional deformation of the side frame.

In the aspect described above, the armrest may be attached to an outside surface in a width direction of the side frame, and the reinforcing member may be cross-linked at an angle in a height direction between an inside surface in the width direction of the side frame and the support frame.

According to this structure, the reinforcing member that inhibits lateral torsional deformation of the side frame is arranged running off at an angle in the height direction, and thus is able to inhibit a feeling of a foreign body due to a bulge toward the center area of the seatback.

In the structure described above, the support frame may be formed as a lower frame that extends between a lower end portion of the side frame on one side of the seatback and a lower end portion of the side frame on the other side of the seatback.

According to this structure, the reinforcing member is able to extend in a compact manner between the side frame and the lower panel that is adjacent to the side frame, so a feeling of a foreign body due to a bulge toward the center area of the seatback is able to be inhibited.

In the aspect described above, the reinforcing member may include a reinforcing panel that is joined to the side frame in a manner overlapping with the inside surface of the side frame, and a cross-linking wire that is cross-linked between a peripheral edge portion of the reinforcing panel and the support frame.

By forming the reinforcing member with the reinforcing panel that is overlapped with the inside surface of the side frame and increases rigidity, and the cross-linking wire that is cross-linked between the side frame and the lower panel, the reinforcing member is able to inhibit lateral torsional deformation of the side frame over a wide area with a lightweight and compact structure. Also, by using the cross-linking wire for the cross-linking structure of the reinforcing member, even with a structure in which the side frame and the lower panel face in different directions, the reinforcing member is able to be joined between them in a state in which both ends are suitably abutted against them, using the characteristic in which the cross-linking wire is able to easily bend in all directions.

In the structure described above, the support frame may be formed as a lower panel that has an upright plate region that extends in a horizontally long upright plate shape between a lower portion of the side frame on one side of the seatback and a lower portion of the side frame on the other side of the seatback. Also, the cross-linking wire may be cross-linked between a lower edge portion of the reinforcing panel and an edge portion of the upright plate region of the lower panel, with one end of the cross-linking wire fixed to one of these portions and the other end of the cross-linking wire fixed to the other of these portions.

According to this structure, the cross-linking wire is able to display high rigidity by being joined to the lower edge portion of the reinforcing panel and thus being as short as possible, as well as by being joined to the edge portion of the upright plate region where the amount of bending with respect to an input load on the lower panel is small.

In the structure described above, the side frame may have a transverse sectional shape having a rear side flange portion that is bent inward in the width direction on an edge portion on a rear side of the side frame. Also, the reinforcing panel may be joined to the side frame in a manner crossing between and overlapping with the inside surface of the side frame and a front side surface of the rear side flange portion.

With this structure, lateral torsional deformation of the side frame is able to be inhibited by the reinforcing panel itself.

In the structure described above, the reinforcing panel may ride up onto a rib formed bulging out on the inside surface of the side frame, and be joined thereto.

According to this structure, the reinforcing member is able to have a structure with high structural strength that enables an input load to the reinforcing panel to be transferred to the highly rigid rib.

In the aspect described above, the reinforcing member may be joined to the side frame in a position that is at the same height as the location where the armrest is attached to the side frame.

With this structure, a lateral load input to the side frame from the armrest is able to be more suitably received by the reinforcing member.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
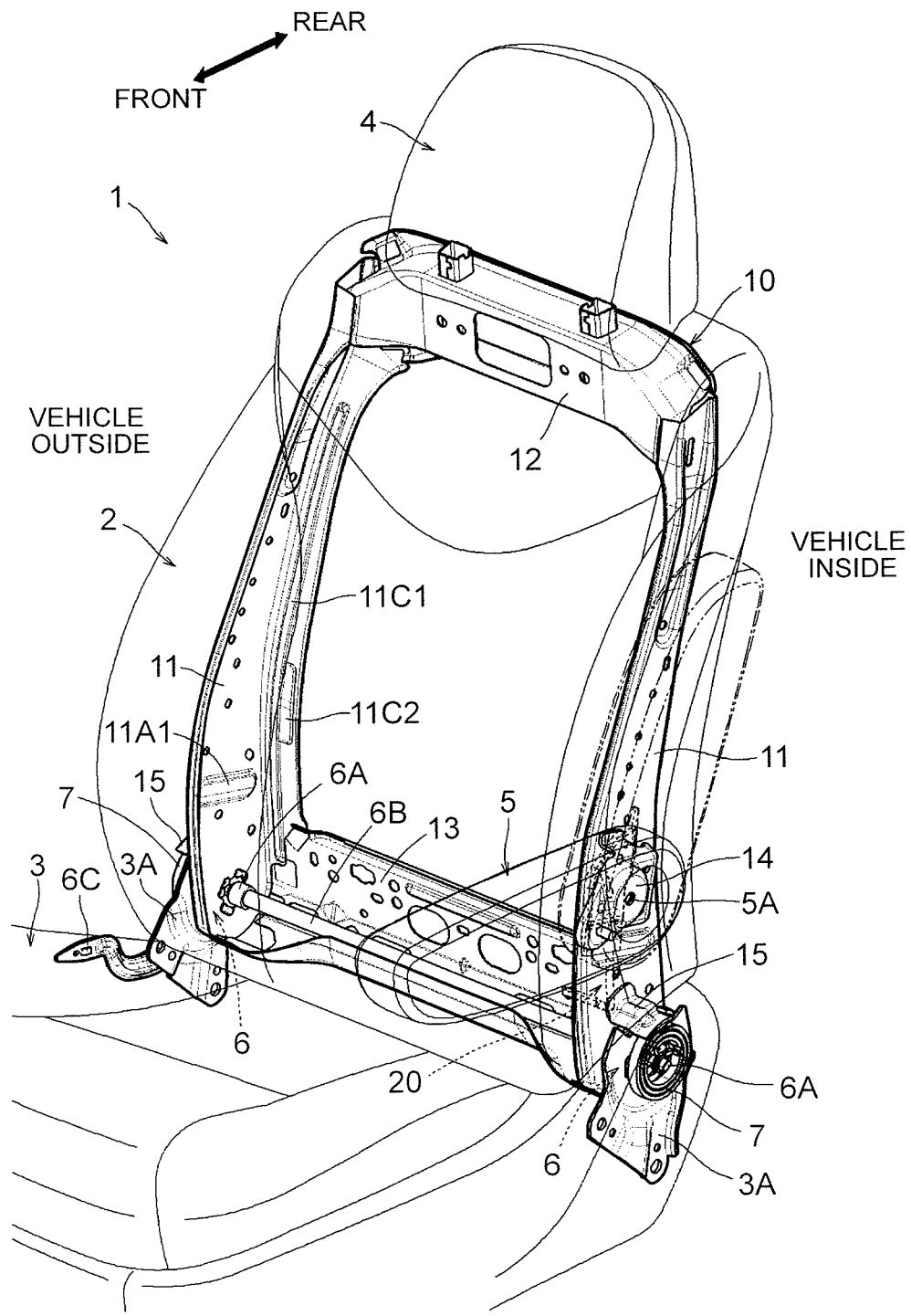
FIG. 1 is a perspective view schematically showing the structure of a vehicle seat according to one example embodiment.

Hereinafter, example embodiments of the invention will be described with reference to the accompanying drawings.

First, the structure of a seat 1 (vehicle seat) of the example embodiment will be described with reference to FIGS. 1 to 7. First, the basic structure of the seat 1 will be described with reference to FIG. 1. In the description below, when the term "seat" is used in conjunction with various directions, such as "seat width direction" or "seat height direction", this indicates the various directions with respect to the seat 1. Also, the terms "seat outside" and the "seat inside" are used to indicate the inside and outside, respectively, in the seat width direction. Further, the terms "vehicle outside" and "vehicle inside" are used to indicate the outside and inside, respectively, in the width direction of the vehicle.

The seat 1 of this example embodiment is configured as a right-side seat of an automobile. The seat 1 includes a seatback 2 that serves as a backrest for a seated occupant, a seat cushion 3 that serves as a seating portion, a headrest 4 that serves as a headrest, and an armrest 5 that serves as an armrest.

The seatback 2 is connected to a rear end portion of the seat cushion 3, in a state that enables the backrest angle to be adjusted via a pair of left and right recliners 6. Each of the recliners 6 is constantly maintained in a locked state that fixes the backrest angle of the seatback 2. Both of the recliners 6 are able to be released together from the locked state and switched to an unlocked state that enables the backrest angle of the seatback 2 to be changed, by an operation that involves lifting up a reclining lever 6C provided on a side portion on the vehicle outside of the seat cushion 3 facing a door, not shown, through which an occupant gets into and out of the vehicle.

By this release operation, the seatback 2 is able to be switched to a state in which the backrest angle is able to be changed in the front-back direction around the recliners 6. The recliners 6 are then urged to return to their locked state that fixes the backrest angle of the seatback 2 again by the reclining lever 6C being returned to its original position after being pulled up. Here, the seatback 2 constantly receives urging force in a forward rotating direction by a pair of left and right spiral springs 7 hooked between connecting portions with the seat cushion 3. With this structure, the seatback 2 is moved so as to fall forward due to being urged, as a result of the recliners 6 being released from their locked state.

The armrest 5 is rotatably pin-connected by a connecting shaft 5A to a side portion on the vehicle inside of the seatback 2. This connection enables the armrest 5 to be placed in either a raised position (a stored position; indicated by the virtual lines) in which it is raised along the side portion of the seatback 2, or a lowered position (an in-use position; indicated by the thin lines) in which it is lowered in front of the seatback 2 from the raised position.

A side frame 11 on the vehicle inside of the seatback 2 that supports the armrest 5 is formed by thin super-high-strength steel plate material that is 1 mm thick and has a tensile strength of 980 MPa, from the viewpoint of achieving both lightweight and high strength. With this kind of structure, the side frame 11 is able to strongly receive a backrest load and various impact loads applied to the seatback 2, even if the plate thickness is thin.

However, when the side frame 11 receives an excessive load such that the armrest 5 attached to the outside portion of the side frame 11 is pushed laterally (left or right) when lowered, a lateral load in which the armrest 5 is twisted right or left may be applied from the location where the armrest 5 is attached. With respect to such a load, the side frame 11 may not be able to strongly receive such a lateral torsional load with only its single plate construction, due to the fact that the plate of the side frame 11 is so thin. Therefore, in order to inhibit lateral torsional deformation of the side frame 11 due to this kind of load, a reinforcing member 20 capable of suitably increasing the torsional strength of the side frame 11 is provided on an inside surface of the side frame 11.

Hereinafter, the specific structure of this reinforcing member 20 will be described in detail together with the frame structure of the seatback 2. First, the frame structure of the seatback 2 will be described. That is, the main framework inside of the seatback 2 is formed by a back frame 10 that is joined together in a rectangular frame-shape when viewed from the front. More specifically, this back frame 10 is formed by a pair of left and right side frames 11 each formed from a vertically long steel plate, an upper frame 12 that is cross-linked between upper end portions of the side frames 11 and is integrated with these upper end portions of the side frames 11, and a lower panel 13 that is cross-linked between lower end portions of the side frames 11 and is integrated with these lower end portions of the side frames 11.

Each of the side frames 11 is formed by a single steel plate that has been press-formed in a vertically long, flat plate shape. These side frames 11 are then arranged facing each other in the seat width direction. Each of the side frames 11 is formed in a shape that tapers toward the seat upper side while curving in an arch toward the seat rear side. Also, the edge portions on the front and rear sides of each of the side frames 11 are bent and rounded toward the seat inside, such that the structural strength of the side frames 11 with respect to bending and twisting is increased, and there are no edges on the outer peripheral portions.

Figure 2:
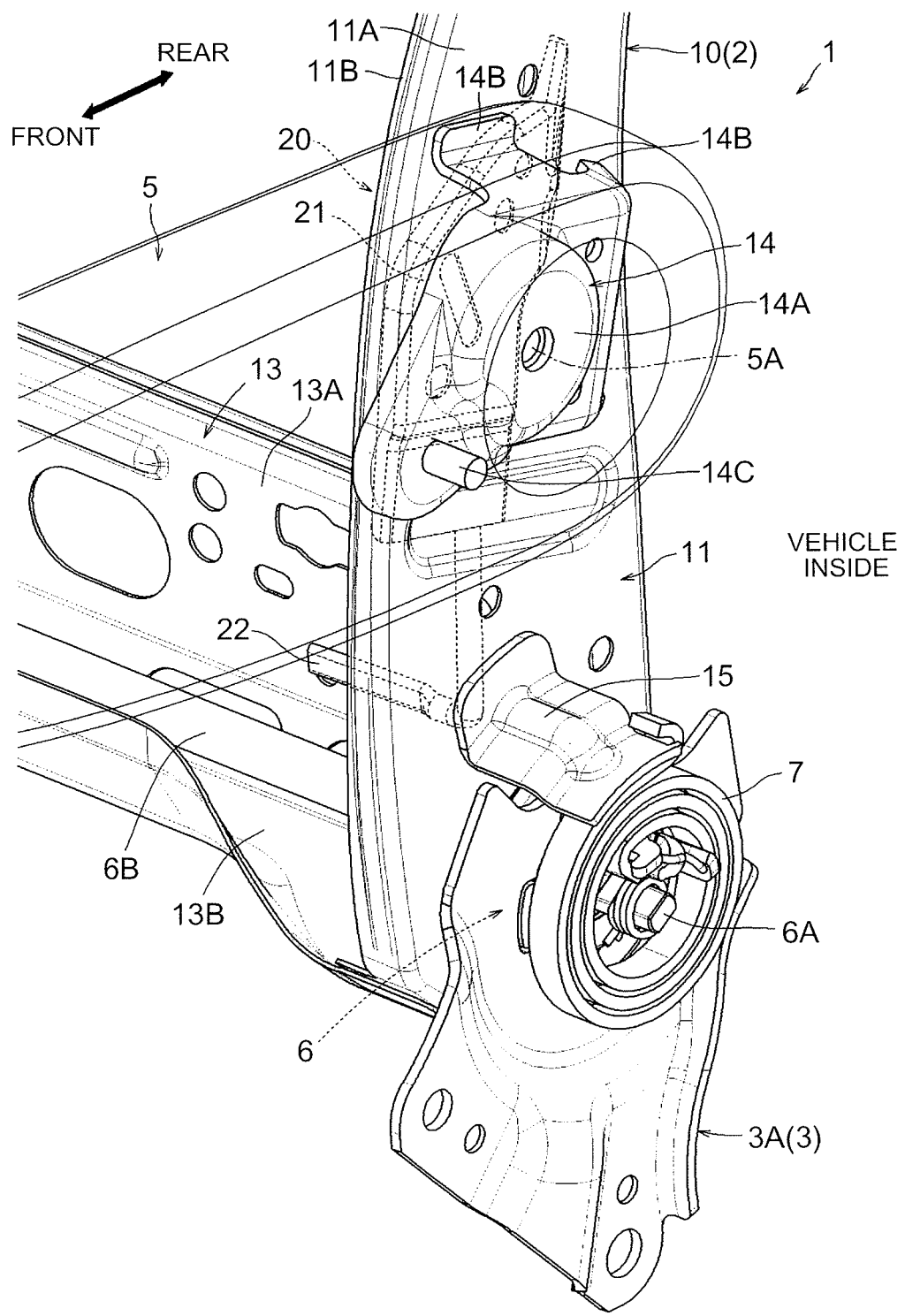
FIG. 2 is an enlarged perspective view of an armrest attaching portion.
Figure 3:
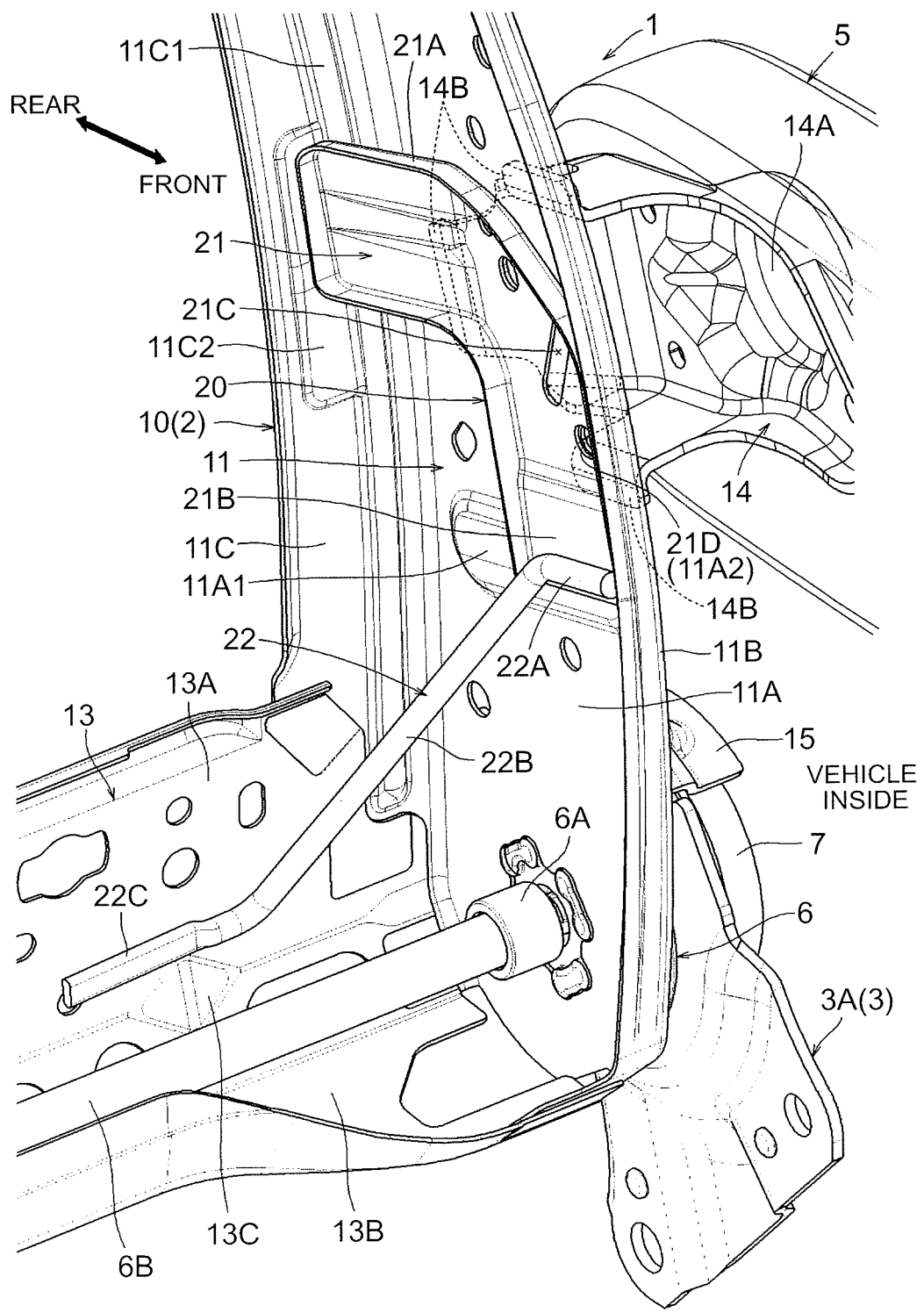
FIG. 3 is a perspective view of FIG. 2 as viewed from the opposite side in the left-right direction.
Figure 4:
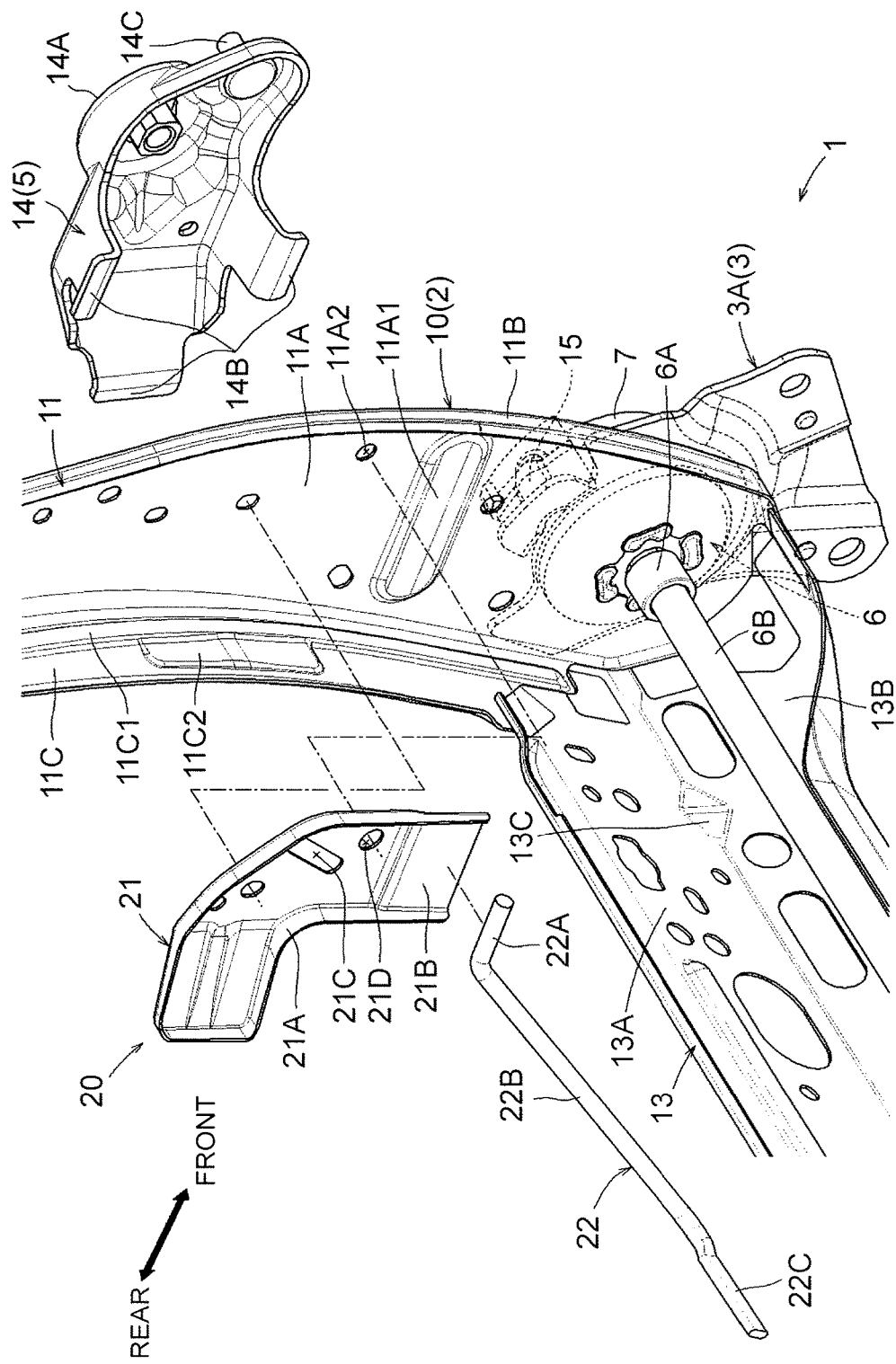
FIG. 4 is an exploded perspective view of FIG. 3.

More specifically, each of the side frames 11 has a shape that includes a side plate portion 11A facing in the seat width direction, a front side flange portion 11B that is bent toward the seat inside from the edge portion on the front side of the side plate portion 11A, and a rear side flange portion 11C that is bent toward the seat inside from the edge portion on the rear side of the side plate portion 11A, as shown in FIGS. 2 to 4. The front side flange portion 11B is bent in a shape substantially perpendicular to the seat inside from the edge portion on the front side of the side plate portion 11A, and moreover, an end portion of the bent tip is bent at an angle toward the rear side. Also, the rear side flange portion 11C is bent in a shape substantially perpendicular to the seat inside from the edge portion on the rear side of the side plate portion 11A, and moreover, an end portion of the bent tip is bent at an angle toward the front side.

Figure 5:
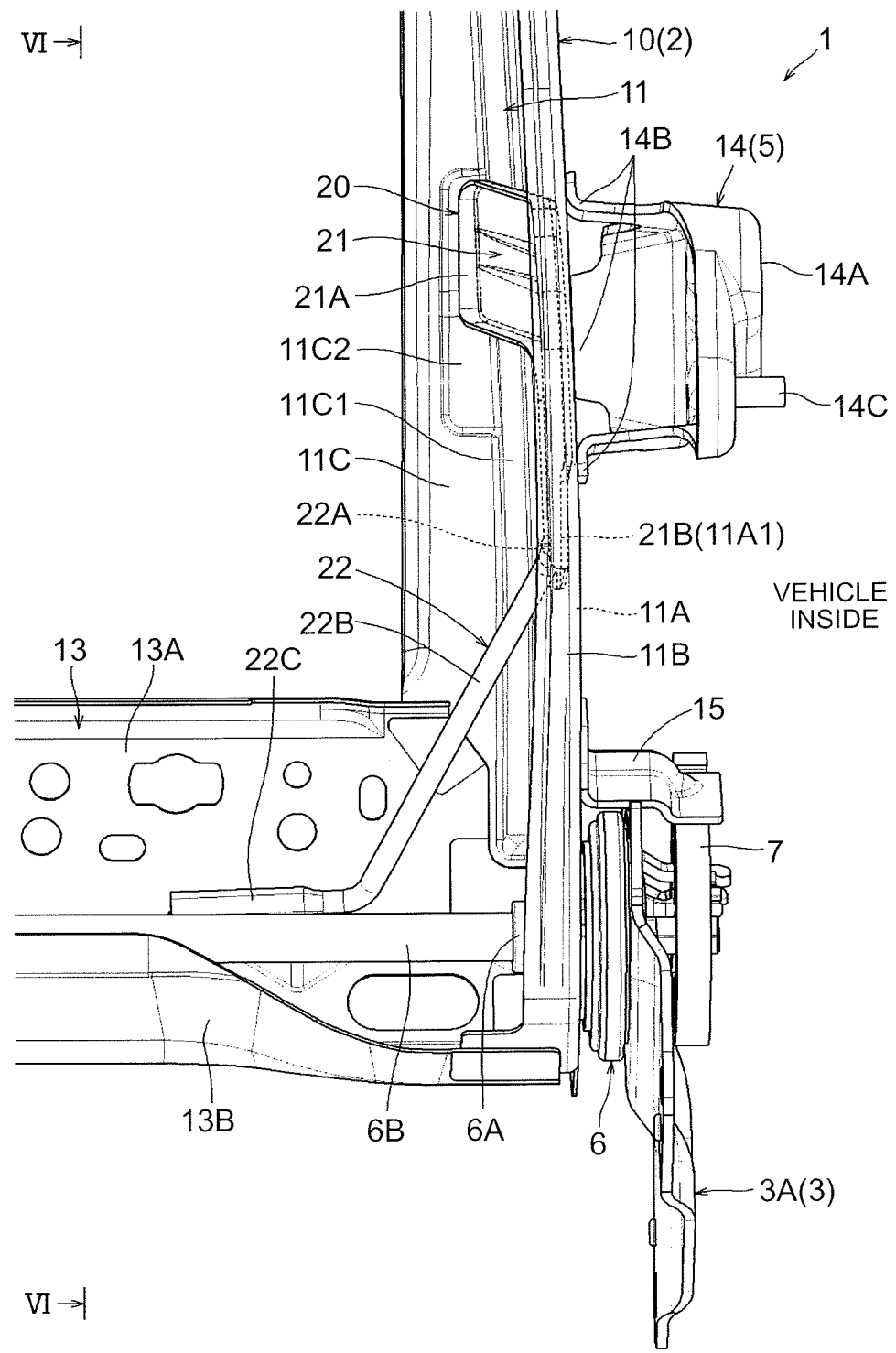
FIG. 5 is front view of FIG. 2.

The rear side flange portion 11C protrudes farther toward the seat inside than the front side flange portion 11B does, as shown in FIG. 5. Therefore, a long vertical reinforcing rib 11C1 that extends in a striated manner in the height direction along an edge portion location on the vehicle inside near the side plate portion 11A, in order to inhibit wrinkles from forming as a result of the side frames 11 being formed in a shape that curves in an arch toward the seat rear side as described above, is formed protruding on the rear side flange portion 11C, as shown in FIG. 4. Furthermore, a rectangular mounting rib 11C2 for further locally inhibiting the formation of wrinkles is formed protruding in a long shape in the height direction in a middle region, in the height direction, where the curvature of the arch is greatest, on the rear side flange portion 11C. The reinforcing rib 11C1 and the mounting rib 11C2 are each formed in a shape that protrudes out toward the seat front side from the rear side flange portion 11C.

Also, an oval-shaped rib 11A1 that is long in the seat front-rear direction is also formed protruding on the side plate portion 11A, in a region at a height where the front-rear width that supports the lower back of a seated occupant is broad, which is a position lower than the mounting rib 11C2 described above. This rib 11A1 is formed in a shape that protrudes toward the seat inside from the side plate portion 11A, and serves to increase the structural strength with respect to bending and twisting in the region of the side plate portion 11A where the front-rear width is broad.

As shown in FIGS. 1 to 3, an outside surface on a lower end side of the side plate portion 11A of each of the side frames 11 described above is joined to an inside surface of a reclining plate 3A that is joined to a rear end portion on both the left and right sides of the seat cushion 3 via the recliners 6. Each of the reclining plates 3A is formed by a steel plate that has high structural strength and is thicker than the side frames 11. Also, as shown in FIG. 3, an operating shaft 6A for operating the lock release of each of the recliners 6 is inserted through the side plate portion 11A of each of the side frames 11 from the seat inside. Hereinafter, portions such as the recliners 6, reclining plates 3A, and operating shafts 6A and the like that are provided in plurality may be referred to in the singular to simplify the description and facilitate understanding.

The operating shaft 6A is assembled inserted into a center portion of the recliner 6, and performs an operation to release the recliner 6 from a locked state by axial rotation. The operating shafts 6A are connected together in an integrated manner in the rotational direction via a connecting rod 6B, as shown in FIG. 1. These operating shafts 6A are axially rotated together by a reclining lever 6C that is connected to the operating shaft 6A on the vehicle outside being pulled up, so as to release the recliners 6 from the locked state.

As shown in FIG. 2, a retaining plate 15 that has been press-formed into a generally L-shaped plate shape is integrally joined by welding to the outside surface of the side plate portion 11A of each of the side frames 11. These retaining plates 15 extend farther to the outside in the seat width direction than the reclining plates 3A described above. Also, each of the spiral springs 7 described above is hooked between a rear end portion of the extended tip of the corresponding retaining plate 15, and an end portion of a tip that has been partially cut out and bent up from the corresponding reclining plate 3A.

As shown in FIG. 1, the upper frame 12 is formed by first press-forming a single steel plate into a long plate shape in the seat width direction, and then bending the entire steel plate into an inverted U-shape when viewed from the side. This upper frame 12 is assembled extending between the upper end portions of the side frames 11, and is firmly and integrally joined to these upper end portions by welding.

The lower panel 13 is formed by first press-forming a single steel plate into a long plate shape in the seat width direction, and then bending the entire steel plate into a J-shape when viewed from the side. This lower panel 13 is assembled extending between the lower end portions of the side frames 11, and is firmly and integrally joined to these lower end portions by welding. More specifically, the lower panel 13 is formed in a J-shape, when viewed from the side, that has a flat plate-shaped upright plate region 13A directly facing in the seat front-rear direction, and a curved plate region 13B that is curved in a shape following a rounded peripheral edge shape on the lower end side of the side frames 11 from the lower edge portion of the upright plate region 13A, as shown in FIGS. 2 and 3.

An edge portion on both the left and right sides of the upright plate region 13A of the lower panel 13 is surface-abutted from the seat front side against the lower region of the rear side flange portion 11C of the side frames 11, and welded thereto. Also, an edge portion on both the left and right sides of the tip of the curved plate region 13B that is bent back toward the seat front side is surface-abutted from the seat front side against the lower region of the front side flange portion 11B of the side frames 11, and welded thereto. More specifically, the edge portion on both the left and right sides of the upright plate region 13A of the lower panel 13 is abutted from the seat front side, along the entire region in the height direction, against the lower region of the rear side flange portion 11C of the side frames 11, and welded thereto. Also, the edge portion on the upper side of the lower panel 13 is bent and rounded toward the seat front side, such that the structural strength with respect to bending and twisting is increased, and there is no edge on the seat rear side.

With this assembly, the lower panel 13 is provided following the peripheral edge shape on the lower end side of the side frames 11, and widely covers the region between the side frames 11 from both the seat rear side and the seat lower side with its surface. Accordingly, the lower panel 13 is provided covering and protecting the connecting rod 6B that connects together the two operating shafts 6A of the recliners 6 and is provided extending between the lower end portions of the side frames 11, from both the seat rear side and the seat lower side. With this assembly, the lower panel 13 is arranged in an orientation in which the surfaces of the lower panel 13 and the side plate portion 11A of the side frame 11 are orthogonal to each other.

As shown in FIGS. 2 to 4, a bracket 14 that is a fixture of the armrest 5 is integrally joined by welding to the outside surface of the side plate portion 11A of the side frame 11 on the vehicle inside. This bracket 14 is formed by press-forming a single steel plate in a pedestal shape that juts out to the seat outside. Three legs 14B that extend out from the edge portions on the upper, lower, and rear sides abut against the outside surface of the side plate portion 11A of the side frame 11, and are welded thereto. The armrest 5 is rotatably connected by the connecting shaft 5A to a mounting seat 14A of the bracket 14, which is formed in a disc-shape on a tip of the bracket 14 that juts out in a pedestal shape. Also, a stopper pin 14C that prevents the armrest 5 from rotating and collapsing downward by abutting with the armrest 5 when the armrest 5 is in the in-use position, is integrally attached to an end portion on the front lower side of the tip of the bracket 14 that protrudes in a pedestal shape.

Next, the structure of the reinforcing member 20 will be described. The reinforcing member 20 is provided extending between the inside surface of the side plate portion 11A of the side frame 11 on the vehicle inside of where the bracket 14 is attached, and the front surface of the upright plate region 13A of the lower panel 13, as shown in FIGS. 3 and 4. The reinforcing member 20 is formed by a reinforcing panel 21 formed by press-forming a single steel plate into an inverted L-shape when viewed from the side, and a cross-linking wire 22 formed by a single steel wire having a circular cross-section that has been bent.

The reinforcing panel 21 is surface-abutted against the side plate portion 11A and the rear side flange portion 11C of the side frame 11, and integrally joined to these by welding, as shown in FIG. 3 and FIGS. 5 to 7. More specifically, the reinforcing panel 21 has a flange portion 21A that is bent up toward the seat inside, formed on the peripheral edge portion, except for the lower side portion, thereof, which increases structural strength with respect to bending and twisting.

Figure 6:
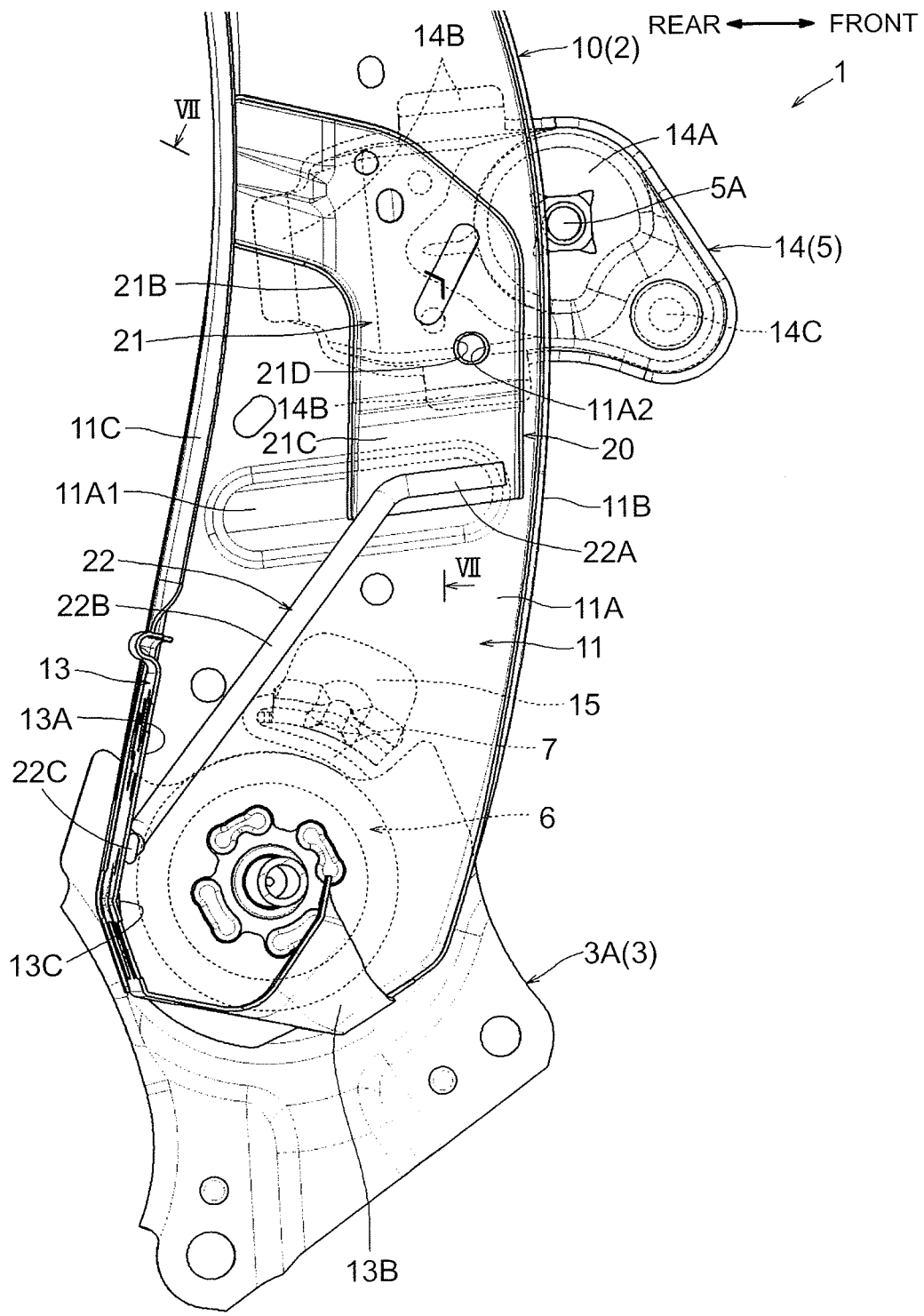
FIG. 6 is a sectional view taken along line VI-VI in FIG. 5.

Also, the reinforcing panel 21 is assembled surface-abutted against a region of the side plate portion 11A of the side frame 11, on the backside of the location where the bracket 14 is attached, as shown in FIG. 6. More specifically, a downward-extending plate portion of the reinforcing panel 21 that is formed in a generally inverted L-shape is abutted against a front side region along the front side flange portion 11B on the inside surface of the side plate portion 11A of the side frame 11, and is welded thereto. More specifically, the reinforcing panel 21 is welded to the side frame 11 at a location where the reinforcing panel 21 abuts against the side frame 11, and that faces a long hole 21C that is formed through the center of the generally inverted L-shape of the reinforcing panel 21 and extends at an angle in the height direction, along an edge portion of the long hole 21C (see FIG. 7).

More specifically, the reinforcing panel 21 has a raised portion 21B that is bent in a step-like fashion so as to be raised up toward the seat inside, formed on a lower end side region of the downward-extending plate portion, as shown in FIGS. 3, 4 and 6. Also, the raised portion 21B of the downward-extending plate portion of the reinforcing panel 21 rides up onto the rib 11A1 formed on the side plate portion 11A, and the lower side portion of the raised portion 21B is welded onto this rib 11A1 (see FIG. 7). As a result, the reinforcing panel 21 is joined to the side plate portion 11A of the side frame 11 in a state in which the structural strength with respect to bending and twisting is increased, by being welded onto the rib 11A1 that has increased structural strength.

Figure 7:
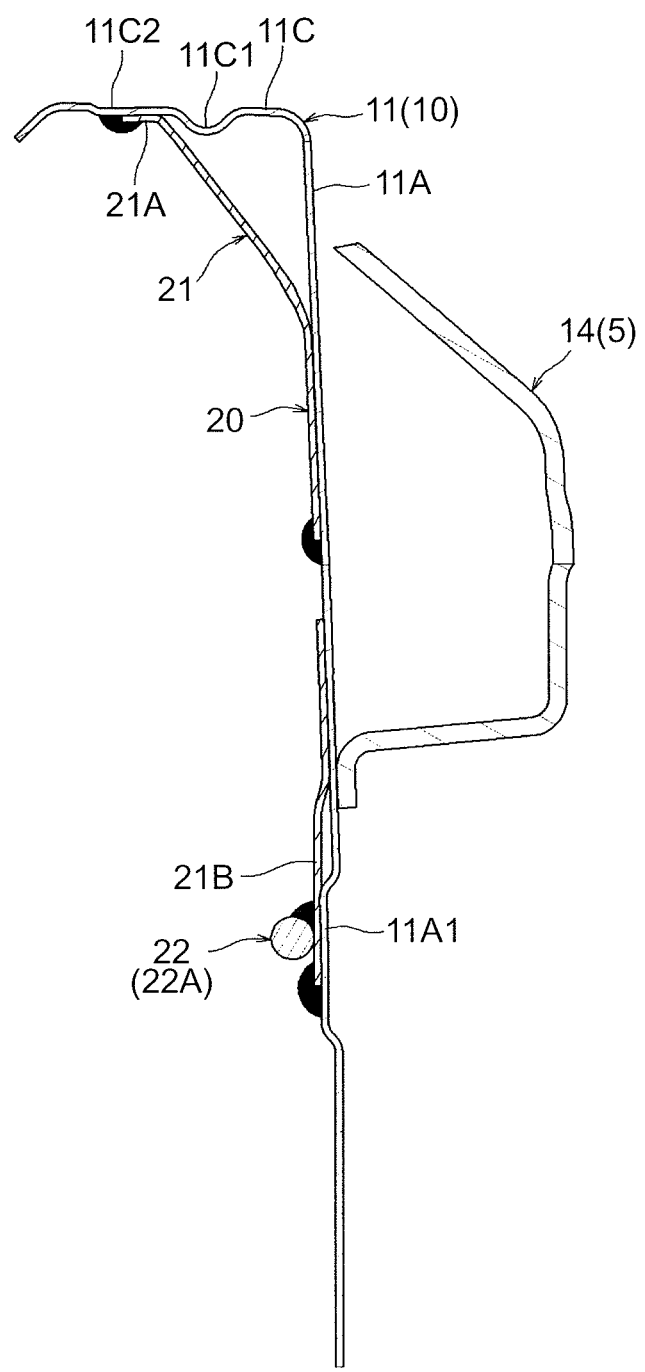
FIG. 7 is a sectional view taken along line VII-VII in FIG. 6.

Also, the plate portion of the reinforcing panel 21 that extends toward the seat rear side and is formed in a generally inverted L-shape is formed bent at an angle toward the seat inside with respect to the plate portion of the reinforcing panel 21 that extends downward, as shown in FIGS. 3 to 5, and an end portion on the rear side of the reinforcing panel 21 is welded with the flange portion 21A surface-abutted against the top of the mounting rib 11C2 formed on the rear side flange portion 11C of the side frame 11 (see FIG. 7). As a result, the reinforcing panel 21 is joined to the rear side flange portion 11C of the side frame 11 in a state in which the structural strength with respect to bending and twisting is increased, by being welded onto the mounting rib 11C2 that has increased structural strength.

Also, the reinforcing panel 21 extends straight and taut between the side plate portion 11A and the rear side flange portion 11C in a manner avoiding the reinforcing rib 11C1 formed on the rear side flange portion 11C, by the plate portion of the reinforcing panel 21 that extends toward the seat rear side being bent at an angle toward the seat inside and abutting against the top of the mounting rib 11C2 of the rear side flange portion 11C. As a result, when a lateral torsional load in which the side plate portion 11A collapses in a direction toward the rear side flange portion 11C, or collapses in a direction away from the rear side flange portion 11C, the reinforcing panel 21 firmly receives these loads as an axial compression load or a tensile load, by the reinforcing panel 21 being interposed in a taut state like a so-called tension rod between the side plate portion 11A and the rear side flange portion 11C.

The reinforcing panel 21 is assembled positioned on the side frame 11 as described below. That is, the reinforcing panel 21 is positioned by a positioning pin, not shown, being inserted through a round pin through-hole 21D formed through the downward-extending plate portion of the reinforcing panel 21, as well as being inserted through a corresponding round pin through-hole 11A2 formed through the side plate portion 11A of the side frame 11, and the reinforcing panel 21 being rotated about this positioning pin such that the edge portion on the rear side of the plate portion that extends toward the seat rear side surface-abuts against the rear side flange portion 11C of the side frame 11, as shown in FIGS. 4 and 6. The pin through-hole 21D formed in the reinforcing panel 21 is, strictly speaking, formed in an oval shape that is slightly longer in the front-rear direction than the pin through-hole 11A2 formed in the side plate portion 11A of the side frame 11 described above (see FIG. 6).

The cross-linking wire 22 is formed bent into a shape that is generally crank-shaped, with an end portion 22A on the upper side extending straight toward the seat front side, a linear portion 22B in the center that extends downward from there extending straight down at an angle toward the rear toward the seat inside, and an end portion 22C on the lower side being bent into a shape extending straight toward the seat inside, as shown in FIGS. 3 to 6. The end portion 22A on the upper side of the cross-linking wire 22 is line-abutted against the inside surface along the lower side portion of the reinforcing panel 21 where there the flange portion 21A is not provided (FIG. 7), and welded thereto. Also, the end portion 22C on the lower side of the cross-linking wire 22 is line-abutted against the lower edge portion of the upright plate region 13A of the lower panel 13, or more specifically, at a location above a diamond-shaped reinforcing rib 13C formed protruding toward the seat front side on a boundary portion between the upright plate region 13A and the curved plate region 13B so as to avoid this reinforcing rib 13C, as shown in FIG. 3.

With this assembly, the cross-linking wire 22 is provided with the linear portion 22B that extends at an angle between the end portion 22A on the upper side and the end portion 22C on the lower side, extending in a straight and taut manner between the reinforcing panel 21 and the lower panel 13. As a result, when the side plate portion 11A receives a load that acts to twist the side plate portion 11A to the left or right, the cross-linking wire 22 firmly receives this load as an axial compression load or a tensile load, due to being interposed in a taut state like a so-called tension rod between the side plate portion 11A (the reinforcing panel 21) and the lower panel 13.

More specifically, the cross-linking wire 22 is attached to and supported by the lower panel 13 that is positioned on the fixed end side (the lower end side) that is non-rotatably retained by the recliner 6 of the side frame 11. Therefore, the cross-linking wire 22 firmly receives the load described above as a result of being supported by the high structural strength of the lower panel 13. More specifically, the cross-linking wire 22 is joined to an area portion on the lower edge side which is particularly resistant to bendably deforming, of the upright plate region 13A of the lower panel 13, so is firmly supported by a portion having high structural strength.

Therefore, even if the armrest 5 receives an excessive load that pushes it laterally to the left or right when it is in the lowered position, the reinforcing member 20 that is formed by the reinforcing panel 21 and the cross-linking wire 22 structured as described above is able to suitably receive the lateral torsional load applied to the armrest 5, without the side frame 11 deforming by greatly twisting to the left or right.

In summary, the seat 1 of this example embodiment has a structure such as that described below. That is, in the seat 1 (vehicle seat) in which the armrest 5 is attached to the side frame 11 of the seatback 2, the reinforcing member 20 that inhibits lateral torsional deformation of the side frame 11 at the location where the armrest 5 is attached to the side frame 11 when a lateral load is applied to the armrest 5, is cross-linked between the side frame 11 and the lower panel 13 (a support frame) arranged in a different position than the side frame 11.

With this kind of structure, the side frame 11 of the seatback 2 that supports the armrest 5 is able to be structured to strongly resist a lateral load received from the armrest 5, by the reinforcing member 20 that inhibits lateral torsional deformation of the side frame 11.

Also, the armrest 5 is attached to the outside surface in the width direction of the side frame 11, and the reinforcing member 20 is cross-linked at an angle in the height direction between the lower panel 13 and the inside surface in the width direction of the side frame 11. With this kind of structure, the reinforcing member 20 that inhibits lateral torsional deformation of the side frame 11 is arranged running off at an angle in the height direction, and thus is able to inhibit a feeling of a foreign body due to a bulge toward the center area of the seatback 2.

Also, the support frame that is a counterpart-side member that the reinforcing member 20 attaches to is formed as the lower panel 13 (the lower frame) that extends between the low end portions both of the side frames 11 of the seatback 2. With this kind of structure, the reinforcing member 20 is able to extend in a compact manner between the side frame 11 and the lower panel 13 that is adjacent to the side frame 11, so a feeling of a foreign body due to a bulge toward the center area of the seatback 2 is able to be inhibited.

Also, the reinforcing member 20 includes the reinforcing panel 21 that is joined to the side frame 11 in a manner overlapping with the inside surface of the side frame 11, and the cross-linking wire 22 that is cross-linked between the lower edge portion (peripheral edge portion) of the reinforcing panel 21 and the lower panel 13. By forming the reinforcing member 20 with the reinforcing panel 21 that is overlapped with the inside surface of the side frame 11 and increases rigidity, and the cross-linking wire 22 that is cross-linked between the side frame 11 and the lower panel 13 in this way, the reinforcing member 20 is able to inhibit lateral torsional deformation of the side frame 11 over a wide area with a lightweight and compact structure. Also, by using the cross-linking wire 22 for the cross-linking structure of the reinforcing member 20, even with a structure in which the side frame 11 and the lower panel 13 face in different directions, the reinforcing member 20 is able to be joined between them in a state in which both ends are suitably abutted against them, using the characteristic in which the cross-linking wire 22 is able to easily bend in all directions.

Also, the support frame that is the counterpart-side member that the reinforcing member 20 attaches to is formed as the lower panel 13 that has the upright plate region 13A that extends in a horizontally long upright plate-shape between the low end portions both of the side frames 11. The cross-linking wire 22 is cross-linked between the lower edge portion of the reinforcing panel 21 and the edge portion of the upright plate region 13A of the lower panel 13, with both ends of the cross-linking wire 22 being fixed thereto. With this kind of structure, the cross-linking wire 22 is able to display high rigidity by being joined to the lower edge portion of the reinforcing panel 21 and thus being as short as possible, as well as by being joined to the edge portion of the upright plate region 13A where the amount of bending with respect to an input load on the lower panel 13 is small.

Also, the side frame 11 has a transverse section that has the rear side flange portion 11C bent toward the inside in the width direction on the edge portion on the rear side. The reinforcing panel 21 is joined to the side frame 11 in a manner crossing between and overlapping with the inside surface of the side frame 11 and the front side surface of the rear side flange portion 11C. With this kind of structure, lateral torsional deformation of the side frame 11 is able to be inhibited by the reinforcing panel 21 itself.

Also, the reinforcing panel 21 is joined to the side frame 11 in a state riding up onto the rib 11A1 formed bulging out on the inside surface of the side frame 11. With this kind of structure, the reinforcing member 20 is able to have a structure with high structural strength that enables an input load to the reinforcing panel 21 to be transferred to the highly rigid rib 11A1.

Also, the reinforcing member 20 is joined to the side frame 11 in a position that is at the same height as the location where the armrest 5 is attached to the side frame 11. With this kind of structure, a lateral load input to the side frame 11 from the armrest 5 is able to be more suitably received by the reinforcing member 20.

Heretofore, one example embodiment of the invention has been described, but the invention may be carried out in a variety of other modes aside from the example embodiment described above. For example, the vehicle seat of the invention may also be broadly applied to a seat provided in a vehicle other than an automobile, such as a railway (e.g., a train), and other types of conveyance such as an aircraft and a marine vessel and the like.

Also, the armrest may be attached to the side frame on either side of the seatback, and may have a non-storable fixed type of structure that is fixed in the lowered state. Further, the armrest may have a type of structure in which it is provided able to be pushed into and be pulled out of the center portion of a type of seat that is able to seat a plurality of people, such as a so-called bench seat. The armrest may also be provided fixed in the lowered state in the center portion of the seatback of the bench seat.

Further, the support frame need only be arranged in a different position than the side frame of the seatback, and may also be another frame such as a side frame on the opposite side, or an upper frame, or some sort of cross-linking frame that is cross-linked between both side frames. Also, the support frame is not necessarily limited to a seatback frame, and may be a frame other than a seatback frame, such as a seat cushion frame or a frame that is integrally provided with the floor. When the seatback is configured to be able to recline, the support frame is preferably formed by a frame on the seatback side so as not to impede the reclining movement. Also, the lower frame that extends between the lower portions of both side frames of the seatback may be formed by a pipe or a wire instead of a panel.

Moreover, all of the reinforcing members may be formed from panels or wires. Also, the reinforcing member may be formed by something other than a panel or a wire, such as a pipe, and is also not limited to metal, but may also be made of resin.

What is claimed is:

1. A vehicle seat comprising a seatback, and an armrest that is attached to a side frame of the seatback, wherein:
   a reinforcing member that inhibits lateral torsional deformation of the side frame at a location where the armrest is attached to the side frame when a lateral load is applied to the armrest, is cross-linked between the side frame and a support frame arranged in a different location than the side frame,
   the reinforcing member includes a reinforcing panel that is joined to the side frame in a manner overlapping with an inside surface of the side frame, and a cross-linking wire that is cross-linked between a peripheral edge portion of the reinforcing panel and the support frame, and
   the side frame includes a rib protruding inwardly relative to the seat, and the side frame has a transverse sectional shape having a rear side flange portion that is bent inward in a width direction of the side frame on an edge portion on a rear side of the side frame, the rear side flange portion including a mounting rib, and the reinforcing panel is joined to the side frame in a manner bridging the rib on the inside surface of the side frame in the width direction of the side frame and a front side surface of the mounting rib on the rear side flange portion.

2. The vehicle seat according to claim 1, wherein the armrest is attached to an outside surface in the width direction of the side frame, and the reinforcing member is cross-linked at an angle in a height direction between the inside surface in the width direction of the side frame and the support frame.

3. The vehicle seat according to claim 2, wherein the support frame is formed as a lower frame that extends between a lower end portion of the side frame on one side of the seatback and a lower end portion of the side frame on the other side of the seatback.

4. The vehicle seat according to claim 1, wherein the support frame is formed as a lower panel that has an upright plate region that extends in a horizontally long upright plate shape between a lower portion of the side frame on one side of the seatback and a lower portion of the side frame on the other side of the seatback, and the cross-linking wire is cross-linked between a lower edge portion of the reinforcing panel and an edge portion of the upright plate region of the lower panel, with one end of the cross-linking wire fixed to one of the lower edge portion of the reinforcing panel and the edge portion of the upright plate region and the other end of the cross-linking wire fixed to the other of the lower edge portion of the reinforcing panel and the edge portion of the upright plate region.

5. The vehicle seat according to claim 1, wherein the reinforcing panel rides up onto the rib, which is formed bulging out on the inside surface of the side frame.

6. The vehicle seat according to claim 1, wherein the reinforcing member is joined to the side frame in a position that is at the same height as the location where the armrest is attached to the side frame.

7. The vehicle seat according to claim 1, wherein the reinforcing panel and the wire are discrete elements.

8. A vehicle seat comprising a seatback including a first side frame and a second side frame, and an armrest that is attached to the first side frame of the seatback, wherein:
   a reinforcing member that inhibits lateral torsional deformation of the first side frame at a location where the armrest is attached to the first side frame when a lateral load is applied to the armrest, is connected between the first side frame and a support frame arranged in a different location than the first side frame, wherein the support frame interconnects a lower portion of the first side frame with a lower portion of the second side frame,
   the reinforcing member includes a reinforcing panel that is joined to the first side frame in a manner overlapping with an inside surface of the first side frame, and a cross-linking wire that is attached between a peripheral edge portion of the reinforcing panel and the support frame,
   the support frame is formed as a lower panel that has an upright plate region that extends in a horizontally long upright plate shape between the lower portion of the first side frame on one side of the seatback and the lower portion of the second side frame on the other side of the seatback,
   the first side frame has a transverse sectional shape having a rear side flange portion that is bent inward in a width direction on an edge portion on a rear side of the first side frame, and the reinforcing panel is fixed to the first side frame in a manner bridging between and overlapping with both the inside surface of the first side frame and a front side surface of the rear side flange portion, and
   the reinforcing member is joined to the first side frame in a position that is at the same height as the location where the armrest is attached to the first side frame.

* * * * *